Aug. 27, 1968    C. L. HURST    3,398,453
METHOD AND APPARATUS FOR ALIGNING WHEELS AND AXLES
Original Filed Dec. 8, 1961    4 Sheets-Sheet 1

INVENTOR.
CHARLES L. HURST
BY

Aug. 27, 1968     C. L. HURST     3,398,453

METHOD AND APPARATUS FOR ALIGNING WHEELS AND AXLES

Original Filed Dec. 8, 1961     4 Sheets-Sheet 2

INVENTOR.
CHARLES L. HURST
BY

Aug. 27, 1968   C. L. HURST   3,398,453
METHOD AND APPARATUS FOR ALIGNING WHEELS AND AXLES
Original Filed Dec. 8, 1961   4 Sheets-Sheet 4

INVENTOR.
CHARLES L. HURST
BY

United States Patent Office
3,398,453
Patented Aug. 27, 1968

3,398,453
METHOD AND APPARATUS FOR ALIGNING
WHEELS AND AXLES
Charles L. Hurst, Dayton, Ohio, assignor to Manufacturers Machine Company, Dayton, Ohio
Continuation of application Ser. No. 158,057, Dec. 8, 1961. This application Mar. 22, 1965, Ser. No. 445,300
20 Claims. (Cl. 33—46)

This invention relates to a method and apparatus for aligning the axles of trailers of tractor-trailer combinations, and is a continuation of my co-pending application, Ser. No. 158,057, filed Dec. 8, 1961, now abandoned, and which, in turn, is a continuation in part of my prior application Ser. No. 44,814, filed July 22, 1960, and now Patent No. 3,137,076.

A great deal of shipping is done by way of tractor-trailer combinations over the highways and one of the most expensive items of maintenance in connection with the trailers are the tires. Excessive tire wear on account of misalignment of the trailer axles can prove to be extremely expensive and it is therefore a matter of economic importance to maintain the axles on trailers of this nature exactly aligned at all times.

Misaligned axles on trailers can also prove to be dangerous on account of the difficulties that might arise in connection with handling of the trailers, particularly on hills or in the case of emergency stops.

While the maintaining of the trailer axles in alignment has always been extremely important, there has not heretofore been available any practical device for accomplishing this. In my co-pending application, Ser. No. 44,814, filed July 22, 1960, I disclose a device for detecting misalignment of trailer axles and which same device is, of course, operable for indicating when a condition of alignment has been obtained when the axles are adjusted from a position of misalignment toward a position of alignment. The present application is by way of being an improvement and refinement of what is disclosed in the above identified application. It will be understood that the wheels on the axle will be misaligned when the axle is misaligned but the wheels can also be mounted improperly and, therefore, be out of alignment even when the axle is aligned. The present invention is particularly directed to the alignment of the axle.

A particular object of the present invention is the provision of a device for detecting and indicating misalignment of the axles of trailers of tractor-trialer combinations which is extremely accurate.

Another object of this invention is the provision of a detecting device of the nature referred to which is easy to use and which is rapid in operation.

Still another object of this invention is the provision of a trailer axle misalignment checking device which can readily be installed in substantially any maintenance depot for tractors and trailers at low cost.

It is also an object of this invention to provide a device for checking and indicating the alignment of the axles of trailers of tractor-trailer combinations which can be used by ordinary maintenance personnel and which does not require a great deal of special training before it can be operated properly.

Still another object of the present invention is the provision of a checking device of the nature referred to which is as readily useable with a loaded trailer as it is with an unloaded trailer.

The several objects referred to above, as well as other objects and advantages of this invention, will be more fully understood upon reference to the following specification taken in connection with the accompanying drawings in which.

GENERAL ARRANGEMENT

The general arrangement of the device according to this invention consists of the provision of a pit in which the device proper is mounted and over which pit trailers can be drawn. Within the pit are two carriages, one for each rear wheel of the trailer. The carriages are locked against movement while the trailer is drawn over them to place the wheels on the carriages and thereafter, the carriages are unlocked and are free to move longitudinally of the trailer.

Each carriage has pivotally supported thereon a V block on which the pertaining trailer wheel rests so each carriage will take a position directly beneath the pertaining wheel.

A member is provided extending between the carriages and laterally slidable therein so that this member will remain parallel with the axle connecting the trailer wheels. In about the middle of this member is mounted an optical device such as a projector that projects an optical beam such as a beam of light forwardly of the trailer and means are provided for locating the member relative to the wheel so that the beam of the optical device is exactly midway between the wheels. If the axle is exactly aligned on the trailer, a beam from the optical device will lie in the same vertical plane as the longitudinal axis of the trailer, and will also lie in the vertical plane of the kingpin of the trailer.

This may be utilized for detecting misalignment of the trailer axle by placing a screen forwardly of the kingpin of the trailer on which the light beam from a projector falls, when the optical device is of this type, and dropping a line from the kingpin so that a shadow from the line falls on the screen. The projector is provided with means for projecting a vertical reference line on the screen and when this reference line registers with the shadow, the trailer wheels are in alignment.

If the shadow and the vertical reference line are not in alignment, the trailer axle is adjusted until this alignment is achieved, whereupon, the carriages are again locked and the trailer can be drawn off the device.

STRUCTURAL ARRANGEMENT

Figure 1:
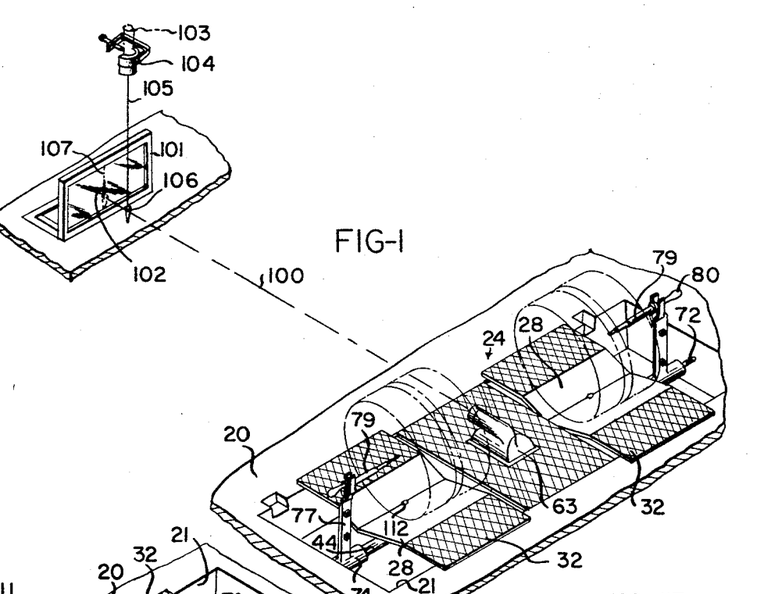
FIGURE 1 is a perspective view showing a device according to the present invention with a set of trailer wheels in place thereon showing how an indication of the condition of alignment of the axle of the trailer is obtained.

Referring to the drawings more particularly, FIGURE 1 discloses how a floor 20 is provided with a pit 21 for receiving the device of the present invention. This pit will also be seen in FIGURES 2 and 3. Fixed within pit 21 are a pair of spaced support plates 22 which carry rails 23 that extend across the pit parallel to each other and in the direction of the short dimension of the pit. Each pair of rails has a carriage generally indicated at 24 rollingly supported thereon and which carriages are the members that receive and support the wheels of the trailer.

Each carriage 24, as will be seen in FIGURES 1, 2, 3 and 4, comprises a lower base member 24' which carries bearing blocks 25 through which axles 26 extend, and on the opposite ends of which are carried the flanged wheels 27 that engage the tracks 23. The carriages are thus supported for free rolling movement in the pit across the shorter dimension thereof.

Figure 2:
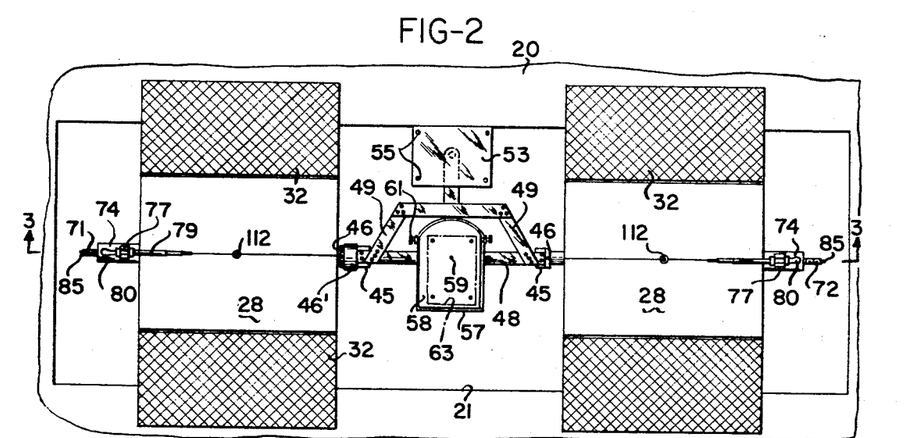
FIGURE 2 is a plan view of the device.
Figure 3:
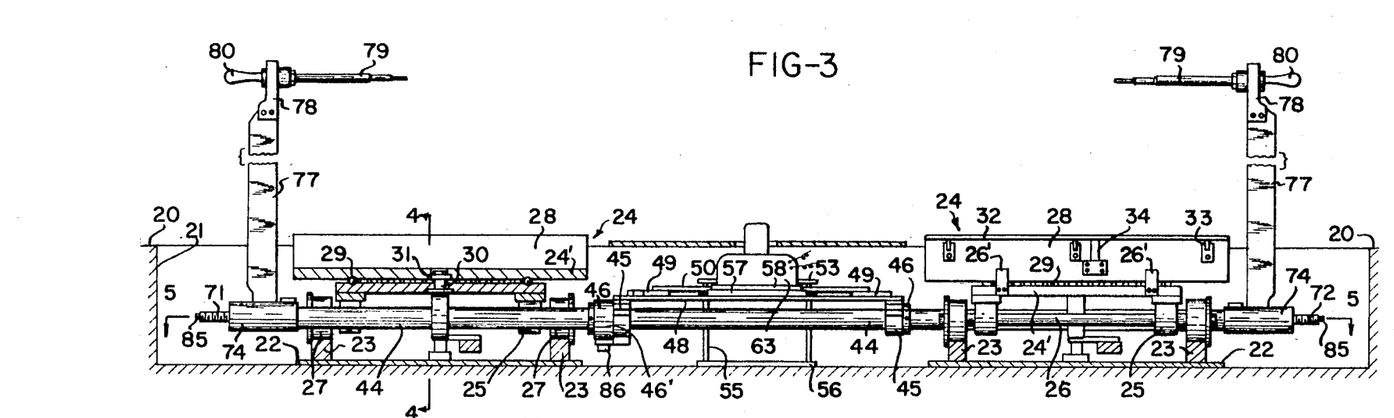
FIGURE 3 is a transverse sectional view indicated by line 3—3 on FIGURE 2.
Figure 4:
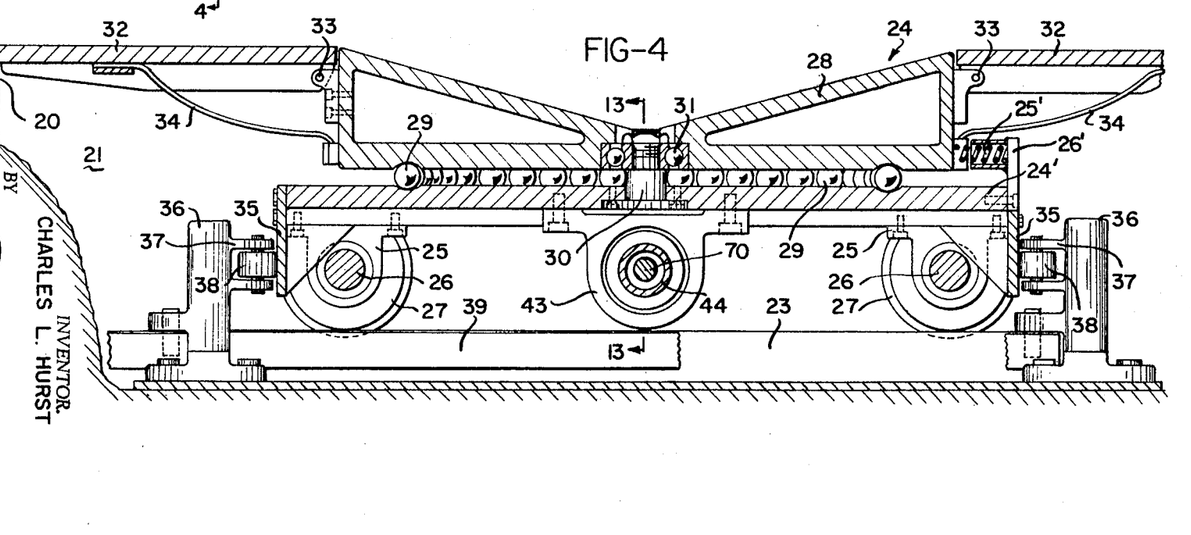
FIGURE 4 is a vertical sectional view indicated by line 4—4 on FIGURE 3.

Each base member 24' has mounted thereon a V block 28 with the backs of the V's extending transversely to tracks 23 as will be seen in FIGURES 1 and 2.

Each V block is supported on its pertaining base member by a series of ball bearings 29 so that the V block can rotate freely on its base. A pivot post 30 engages the V block and its base member on the axis of relative rotation thereof and this post preferably is secured to the base fixedly while being connected with the associated V block by an antifriction bearing 31.

Each V block has pivoted thereto at the front and back edges thereof a stiff drive-on plate 32. Pivots 33 connect these plates with the V block and stiff leaf springs 34 normally hold the plates upwardly from floor 20, as will be seen at the left side of FIGURE 4, so that these plates do not interfere with the free rolling movements of the carriages. However, in moving a trailer on or off the V blocks, these plates will yield downwardly at their outer ends and engage the floor and thus provide ramps for supporting the trailer wheels as it moves to and from the V blocks.

Figures 5, 6:
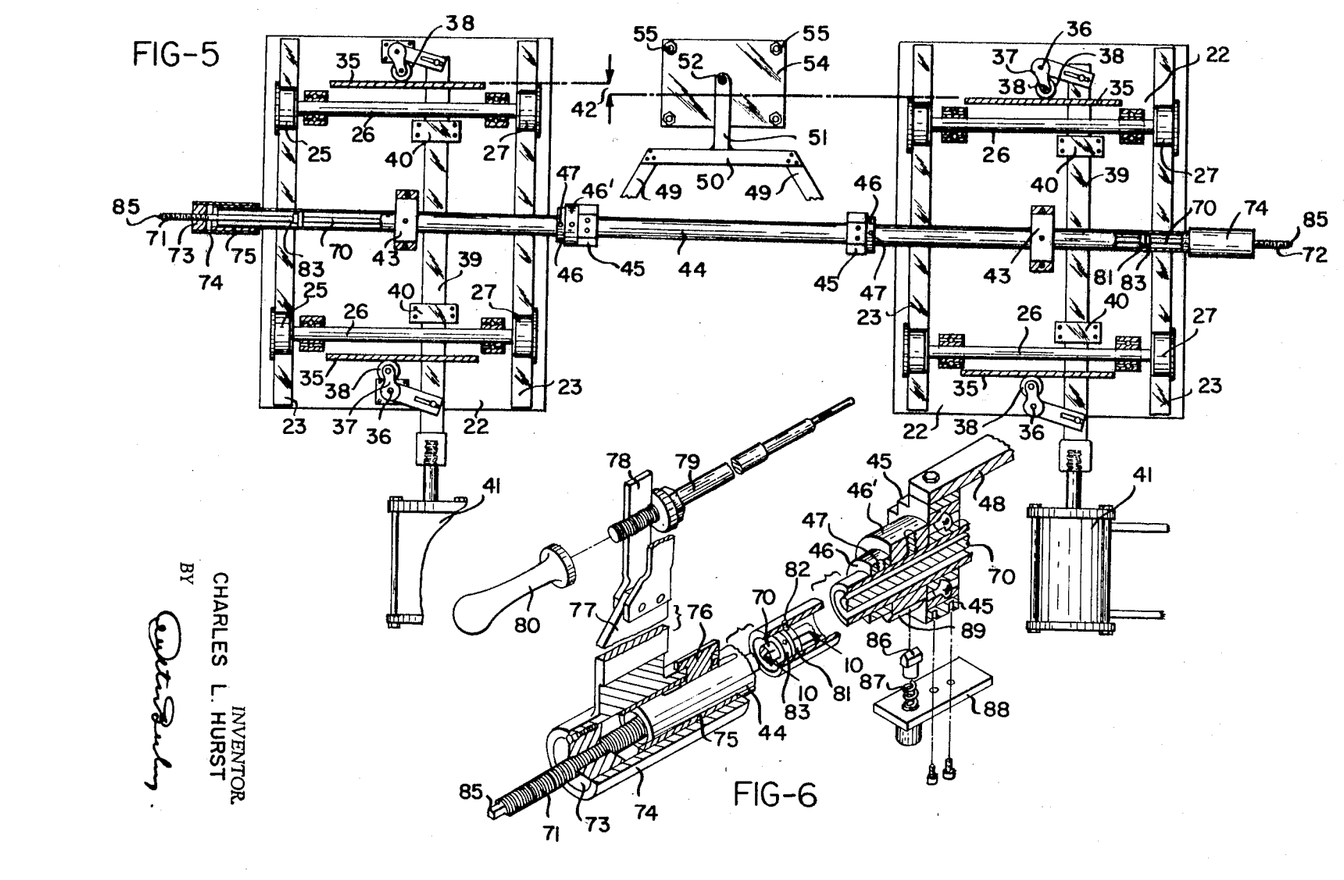
FIGURE 5 is a plan sectional view indicated by line 5—5 on FIGURE 3.
FIGURE 6 is a perspective sectional view showing a portion of the device more in detail.

In order to hold the carriages against movement on their rails when trailers are being drawn to and from the carriages, each carriage has dependant from the front and back edges of base 24', a stop plate 35. These stop plates are employed, as will be seen in FIGURE 5, to provide for fixed locked positions of the carriage. This is done by providing upstanding pivots 36 on plate 22 and on which pivots are mounted the cranks 37 that carry rollers 38 adapted for engaging the stop plates 35. These cranks are interconnected by bars 39 that are reciprocably guided on plates 22 by slide bearings 40 so that in one direction of movement of the bars, rollers 38 are brought against the stop plates as indicated in FIGURE 5 whereas by an opposite movement of the bars 39, the levers 37 can be caused to turn about their pivot supports and move the rollers away from their perspective plates thereby to release the carriages for free movement along their reciprocative rails.

The V blocks are biased toward a center or neutral position by springs 25' which bear between the V blocks and plates 26' carried by the base member 24'.

The double acting air motors 41 connected with bars 39 are operable for reciprocating the bars 39 between their two operative positions.

For reasons which will become more apparent hereinafter, the corresponding stop plates 35 pertaining to the two carriages are offset in the direction of movement of the carriages a small distance, for example, ¾ of an inch or so, as indicated by the dimension 42 in FIGURE 5. This offset has no influence on the free movement of the carriages once the carriages are unlocked.

On the underside of each base member 24' of each carriage 24 and in vertical alignment with the axis of rotation of the respective V block, there is a self-aligning bearing 43. Extending slidingly through bearings 43 is a tube 44. while this tube 44 is not fixedly connected with either carriage, it will be evident that the axis of the tube will always pass through the axis of rotation of both of the V blocks 28.

Between the carriages, tube 44 carries spaced bearing blocks 45 which are fixed axially of tube 44 by stop collars 46 that are locked to tube 44, as by set screws 47.

Bearing blocks 45 are availed of for supporting the platform that carries the projector that projects a beam of light that is used for detecting misalignment of the wheels of a trailer that are resting on the V blocks. The frame for this support platform will be seen in FIGURES 2, 3 and 7 through 9. This frame comprises a bar 48 extending between and fixed to bearing blocks 45. Angling forwardly and inwardly from bar 48 and fixed thereto are shorter bars 49 which are fixedly connected at their forward ends by another bar 50.

Figures 7, 8, 10:
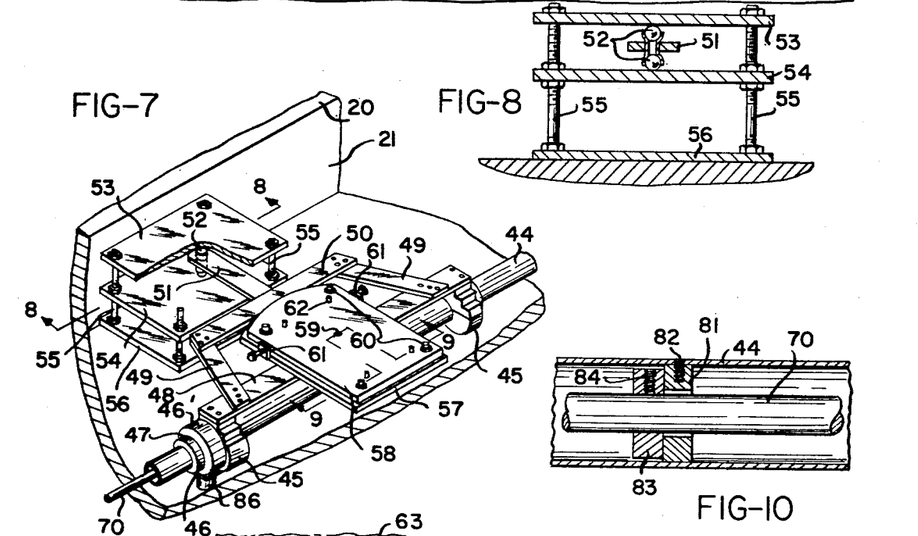
FIGURE 7 is a perspective view, partly broken away, showing the construction of a support arrangement for an optical device such as a projector forming a part of the mechanism.
FIGURE 8 is a vertical sectional view indicated by line 8—8 on FIGURE 7.
FIGURE 10 is a sectional view indicated by line 10—10 on FIGURE 6 showing a pair of stop collars that relatively locate two of the elements of the device.
Figure 9:
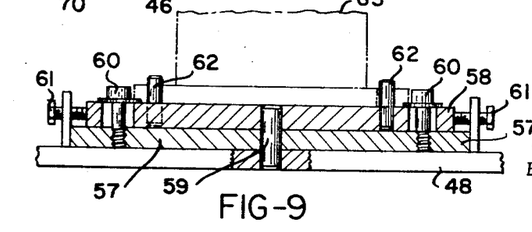
FIGURE 9 is a sectional view indicated by line 9—9 on FIGURE 7, showing how the device of FIGURE 7 includes an adjustable platform.

Extending forwardly from the center of bar 50 is an arm 51 which is employed for supporting the frame made up of the said bars in a horizontal position. To that end, the forward-most end of bar 51 carries the double ended roller device 52 which, as will be seen in FIGURE 8, is disposed between a pair of plates 53 and 54 that are adjustably mounted on the posts 55 that are fixed to a support plate 56 that is attached to the bottom wall of pit 21.

The bar-like framework carries a base plate 57 that is fixed to the framework. Resting on this base plate is an adjustable projector support plate 58 doweled to the lower base plate by dowel pin 59 in about the middle of the plates.

Upper plate 58 is adapted for angular adjustment on lower plate 57 about dowel pin 59 by loosening clamp screws 60 that clamp the plates together and then adjusting the cap screws 61 which are carried by lower plate 57 and abut the edges of upper plate 58.

Upper plate 58 has dowel pins 62 projecting upwardly therefrom adapted for entering holes in the base of a projector 63 which projects a beam of light forwardly beneath a trailer which has its wheels on the V blocks.

At this point it will be appreciated that as the V blocks move forwardly and backwardly relative to each other, tube 44 will be caused to change its angle relative to a transverse line extending through the center of the pit and this change of angle of tube 44 will in turn cause the projector 63 to change its angle so that a beam of light projecting forwardly from the project will change its angle in a horizontal direction. Specifically, tube 44 remains parallel to the axis of rotation of the wheels, and the beam of light from the projector remains perpendicular to the tube.

The tube 44 however, as mentioned, is free slidably in said aligning bearings 43 and this is necessary so that the tube and projector can be properly aligned axially with the wheels resting on the V blocks 28.

The last mentioned alignment is accomplished by devices carried by the outer ends of tube 44 and engageable with the ends of the wheel axles or with some other fixed locating area on the wheels. As shown in FIGURES 1, 2, 3, 5 and 6, and, particularly, FIGURE 6, I accomplish this by running a long rod 70 axially through tube 44 and then oppositely threading opposite ends of the rods as at 71 and 72. A nut 73 engages each of the threaded portions of the rod so that by rotating the rod in the nuts, the nuts 73 will be caused to move toward each other or away from each other.

Each nut is attached to a sleeve element 74 that telescopes over the adjacent end of tube 44 and is slidably supported thereon as by a sleeve bushing 75. Each sleeve element 74 is slidably keyed to tube 44 by a key 76 and each tube element 74 carries an upstanding arm part 77 that has slot means 78 at the upper end for detachably receiving a centering rod 79 which may be fixed to the slot means as by the handle 80 threaded to the centering rod.

FIGURE 10 shows the manner in which rod 70 is located in tube 44. Somewhat inwardly from each end of tube 44 there is fixed in the tube a collar 81, as by set screw 82, and abutting the outside faces of the collars 81 are collars 83 fixed to rod 70 by set screws 84.

By the described arrangement, when the wheels of a trailer are resting on the V blocks, the center rods 79 are moved inwardly against the ends of the wheel axles, or other corresponding locating surfaces by rotation of rod 70, as by means of the squared end 85 thereof, and, when both centering rods are in abutting engagement with their corresponding locating surfaces, the rod 70 and, therefore, the tube 44 and the framework supporting the projector, will be exactly centered relative to the trailer wheels.

Releasing of the mechanism is accomplished by rotating rod 70 in the opposite direction to back the centering rods away from the surfaces which they engage.

When centering rods are backed off, the arms 77 can be swung downwardly to a horizontal position and thus be disposed out of the way below the level of floor 20. When either arm is swung down, both arms and the tube 44 will rotate as a unit so that this operation can be carried out from either end of the device.

At least in the upright positions of arms 77, a detent is provided to hold the arms in operative position. This detent is indicated at 86 in FIGURE 6 and is urged upwardly by spring 87 carried by plate 88 attached to the bottom of bearing blocks 45. The detent is adapted for entering a groove 89 in a detent collar 46' positioned adjacent the bearing block.

FIGURES 1 and 2 show the projector 63 that is supported on the support previously described that consists of the tube 44 and the bar-like framework which carries the support consisting of plates 57 and 58.

As will be seen in FIGURE 1, the projector 63 projects a beam of light 100 toward screen 101. This beam of light includes a vertical reference line 102 that falls on the screen.

Toward the front end of the trailer is the kingpin 103 and there is a clamp member 104 adapted for clamping on the kingpin and from which clamp member is suspended a line 105 that is held taut by a plumbing bob 106. The plumb bob causes the line to hang vertically on the axis of the kingpin.

At this point it will be apparent that the line will show a shadow on the screen at 107 on account of the light beam from the projector, and that the angle of adjustment of the projector can cause the reference line projected thereby to fall directly on the shadow from line 105. When the reference line and shadow coincide, the trailer wheels are in exact alignment because the axis of rotation thereof extends exactly perpendicular to the longitudinal axis of the trailer wheels which longitudinal axis is in the vertical plane of the center line of 100, said plane also containing the shadow 102 and the reference line 107.

Figures 11, 12, 13:
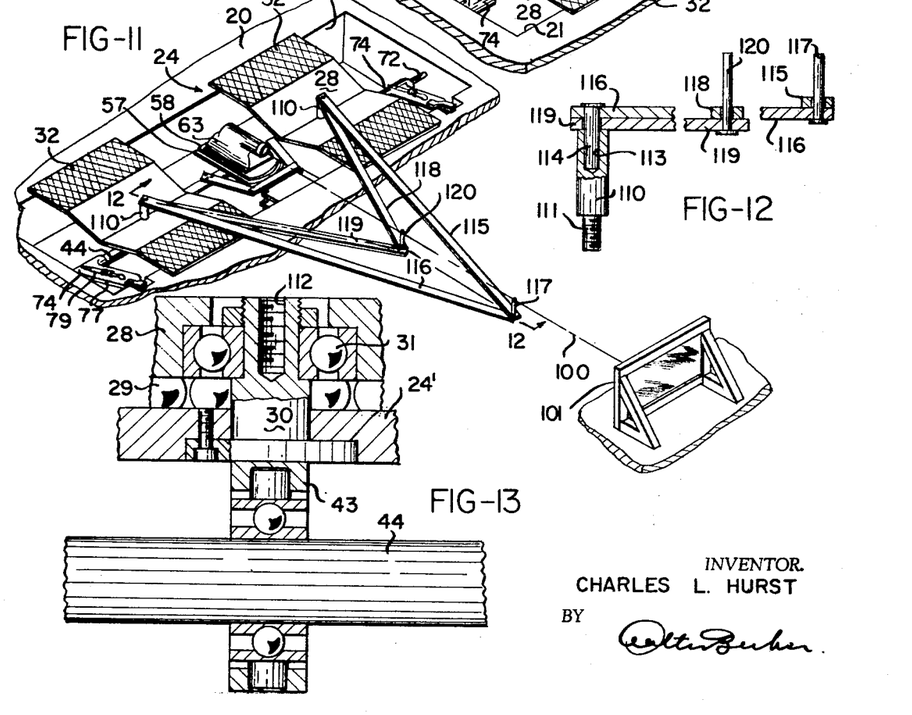
FIGURE 11 is a perspective view showing how the device is preset or calibrated by using gauge bars of a particular nature.
FIGURE 12 is a sectional view indicated by line 12—12 on FIGURE 11 showing the manner in which the gauge bars are connected with each other.
FIGURE 13 is a fragmentary vertical sectional view indicated by line 13—13 on FIGURE 4, showing the pivot arrangement for one of the wheel supporting platforms of the device.

For calibrating or effecting preliminary adjustments of the device, the instrumentalities illustrated in FIGURES 11 and 12 are employed. First, posts 110 are mounted on the axis of rotation of the V blocks. These posts 110 have threaded lower ends 111 which thread into the threaded recesses 112 formed in the upper ends of the pivot posts 30 for the V blocks. Each post 110 has an axial bore 113 in the upper end adapted for receiving a pin 114. One such pin will be seen fastened to one end of a gauge bar 115. As will be seen in FIGURE 11, gauge bar 115 is one of a pair, the other of which is numbered 116, each gauge bar extending from a different one of the posts 110 on the V blocks. Gauge bar 116 has an upstanding sighting pin 117 that extends through an aperture in the end of bar 115 so that the bars 115 and 116 together establish a triangle with the three apices fixed, and the third being determined by the sighting pin 117.

Another and smaller triangle is set up by bars 118 and 119 which are similarly arranged except that at their V block ends these bars have holes for receiving the pins 114 of the bars 115 and 116. At their outer ends, bars 118 and 119 are connected by sighting pin 120.

The two triangles established by the gauge bar pairs are both isosceles triangles, and the two sighting pins 117 and 120 will thus lie on an axis extending centrally between the V blocks and at right angles to a line joining the axis of rotation of the V blocks. Accordingly, the projector 63 can be centered up between the platforms and if the reference line thrown by its light beam does not coincide with the shadow of sighting pins 117 and 120, adjustments are made in the projector or its support plate, so that the reference line does coincide with said shadow. When this is accomplished, the device is calibrated and is in adjustment and is ready to put into operation.

OPERATION

In operation, after the device has been calibrated as described above, the air motors 41 are operated to lock the carriages in place. A trailer is then drawn over the device so that its rear wheels rest on the V blocks. The front end of the trailer is then cleared by removing the tractor therefrom and supporting the front end of the trailer by some other means, and, then clamp 104 is attached to kingpin 103 so that line 105 hangs vertically down on the axis of the kingpin.

As mentioned, the locks for the carriages are slightly offset longitudinally and this offset is availed of at this time to make certain the wheels are properly located on the blocks. This is accomplished by reversing the motors 41 several times which will cause the V blocks to assume the proper centered positions under their respective wheels.

It might be noted at this time that all of the equipment is strong enough to permit loaded trailers to be drawn on the device so that the wheels can be aligned with the trailer either loaded or unloaded and fully equivalent results will be had in both cases.

After the trailer is in position, with its wheels on the V blocks, the arms 77 are brought up into position and rod 70 is then rotated by a crank or wrench until centering rod 79 engage corresponding predetermined areas on the wheels, or on the hub caps therefor, or on the ends of their axle, whereupon the supporting platform for the projector will become centered between the wheels. Since tube 44 is slidable in the bearings by which it is supported on the carriages, this is quite readily accomplished.

With the projector centered and carriages unlocked, the projector is now turned on and any misalignment of the trailer axle will be immediately observed on the screen by the lateral distance between reference line 107 and the shadow of line 105, and adjustments, if necessary, can be made. Most trailer arrangements have turnbuckle type struts connecting the axle at at least one end to the pertaining side of the trailer body and this strut can be utilized to move the trailer axle at that end so as to bring the axle into the proper position of alignment. Since the V blocks are freely pivoted on their respective bases, and the carriages are freely movable in the fore and aft direction, it will be obvious that this adjustment can be readily accomplished and even a slight movement of the trailer axle during adjustment thereof will be reflected in a movement on the screen of the light beam from the projector.

If the trailers do not have turnbuckle struts, it may be necessary to loosen the axle on the spring supports to shift the axle, but this, also, is easily accomplished.

Extremely accurate results can be obtained and the mechanism is simple to use, as has been described above.

After the aligning process is completed, the projector may be turned off, the air motors operated to lock the carriages, rod 70 rotated to back off centering rods, and the arms 77 then turned down to their idle, out-of-the-way position. The trailer can then be removed from the device and the device is then ready for checking another trailer.

All movable parts of the device are freely movable but are accurately guided at all times so that extreme accuracy can always be obtained.

The provision of the adjustable outboard support represented by double ended ball bearing 52 for the projector platform permits the beam from the projector to be raised and lowered at will to accommodate for various conditions but this does not in any way detract from the accuracy of the device.

It will be appreciated that the accuracy of the device is determined by the accuracy of the centering of the tube 44 and the accuracy with which the axis of the tube 44 is maintained in intersecting relation with the axle of rotation of the V blocks. Since the structure disclosed readily accomplishes this and maintains a high degree of accuracy, at these points, it follows that the device produces accurate results. At the same time, the device is extremely strong and can withstand abuse for long periods of time and support heavy loads and still remain in operative condition.

Where trailers have tandem axles, as is often the case, the two axles are aligned individually, one after the other, both in the same manner, and the end result is complete alignment of the trailer axles.

It will be understood that this invention is susceptible to modification to adapt it to different situations and it is accordingly desired to comprehend within the purview of this invention such modifications as may be considered to fall within the scope of the appended claims.

What is claimed is:

1. In a device for detecting and indicating the position of trailer axles with respect to the true aligned position thereof; a pair of spaced carriages adapted for receiving the wheels of a trailer, means supporting the carriages for free movement in the fore and aft direction of the trailer, a projector between the carriages for projecting a beam of light forwardly of the trailer, support means supporting the projector and connected with said carriages so that relative movement between said carriages in the fore and aft direction will turn the projector about a vertical axis, said support means including centering means operable for centering the projector between the wheels, and means for indicating the horizontal angularity between the beam of light from said projector and the longitudinal axis of the trailer.

2. In a device for detecting and indicating the position of trailer axles with respect to the true aligned position thereof: a pair of spaced carriages adapted for receiving the wheels of a trailer, means supporting the carriages for free movement in the fore and aft direction of the trailer, a projector between the carriages for projecting a beam of light forwardly of the trailer, support means supporting the projector and slidably engaging said carriages so that relative movement between said carriages in the fore and aft direction will turn the projector about a vertical axis, centering means on said support means adjustable into engagement with corresponding points on the wheels for centering said projector between the wheels, and means for indicating the horizontal angle between the beam of light from the projector and the longitudinal axis of the trailer.

3. In a device for detecting and indicating the position of trailer axles with respect to the true aligned position thereof; a pair of spaced carriages adapted for receiving the wheels of a trailer, means supporting the carriages for free movement in the fore and aft direction of the trailer, a projector between the carriages for projecting a beam of light forwardly of the trailer, support means supporting the projector and slidably engaging said carriages so that relative movement between said carriages in the fore and aft direction will turn the projector about a vertical axis, centering means on said support means adjustable into engagement with corresponding points on the wheels for centering said projector between the wheels, a screen at the front end of the trailer on which the light beam falls, means for dropping a line from the king pin of the trailer so a shadow will be thrown by the line on said screen, and said projector including means for projecting a vertical reference line in the beam for registration with said shadow.

4. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow.

5. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a self aligning bearing carried on the underside of each carriage on the said axis, a tube slidable in said bearings, a platform on the tube between said carriages adapted for supporting a projector for projecting a beam of light forwardly beneath the trailer, a rod extending through said tube and fixed against axial movement therein, centering members on opposite ends of the tube, said rod having its opposite ends oppositely threaded and threadedly engaging said centering members so rotation of the rod will move said centering members in unison away from said wheels or toward said wheels into engagement therewith to locate said tube axially relative to said wheels, said platform being located on said tube midway between said centering members, a screen in front of the trailer on which the beam of light from a projector on said platform falls, and means for dropping a line vertically from the trailer on the axis of pivotal connection with a tractor.

6. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and said shadow, there being locking means to lock said carriages against movement while drawing a trailer on or off the carriages and to unlock said carriages when the wheels of the trailer are resting thereon.

7. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and said shadow, locking means to lock said carriages against movement while drawing a trailer on or off the carriages and to unlock said carriages when the wheels of the trailer are resting thereon, said locking means holding said carriages in respective different fore and aft positions whereby repetitive application of said locking means when a trailer has its wheels on said carriages will shake the carriages and relieve any static friction stresses in the carriages or trailer wheels.

8. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow, said device being disposed in a pit in a floor with the said V blocks in about the plane of the floor, ramp members pivoted to the front and back edges of the V blocks and extending beyond the edges of the pit to support the trailer wheels being moved on or off the V blocks, and springs between the V blocks and the ramp members urging the ramp members upwardly off the floor at their outer ends.

9. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow, said V blocks being spring biased on said carriages toward a predetermined rest position thereon, a pit in which the device is mounted, and ramp members extending between the floor at the edge of the pit and the V blocks normally disengaged from one thereof so as not to inhibit free movement of the carriages and operable to support trailers moving on and off said device.

10. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a rigid member extending between said carriages and pivoted thereto on said axes, said member being freely slidable on each carriage in the direction of the length of said member, a centering element axially movable on each end of said member, means connecting said centering elements for equal and opposite movements of said member for engagement on the trailer wheels by said centering elements to locate said member axially with respect to said wheels, a projector carried by said member midway between said centering elements operable to project a beam of light forwardly beneath said trailer, a screen in front of the trailer, and means for dropping a line vertically from the trailer on the axis of pivotal connection of the trailer with a tractor.

11. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow, said centering members comprising upstanding arms and rod elements thereon adapted for engagement with the centers of the trailer wheels.

12. In a device for detecting and indicating the position of trailer axles with respect to the true aligned position thereof; a pair of spaced carriages, parallel rails supporting said carriages for movement thereof longitudinally of a trailer having its wheel on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow, said centering members comprising upstanding arms and rod elements thereon adapted for engagement with the centers of the trailer wheels, said tube being rotatable so said arms can be raised or lowered.

13. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow, said centering members comprising upstanding arms and rod elements thereon adapted for engagement with the centers of the trailer wheels, said tube being rotatable so said arms can be raised or lowered, said platform being rotatably connected with said tube and means attached to the platform to hold it in a fixed position while said tube is rotated.

14. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a bearing carried on the bottom of each carriage on the said axis, a member extending slidably through said bearings, a platform on the member between said carriages, a projector on the platform projecting a beam of light forwardly beneath the trailer and said beam including a vertical reference line, means on said member adjacent each wheel equidistant from said projector and adjustable on the member in unison toward and away from the wheels for being brought into engagement with the wheels for centering said projector between the wheels, a screen in front of the trailer on which the light beam from the projector falls, and means for supporting a line vertically from the king pin of the trailer whereby the line will cast a shadow on the screen, any misalignment of the trailer axle being indicated by lateral spacing on the screen between the said reference line in the light beam and the said shadow, said centering members comprising upstanding arms and rod elements thereon adapted for engagement with the centers of the trailer wheels, said tube being rotatable so said arms can be raised or lowered, an arm projecting forwardly from said platform, a double ended ball bearing on the outer end of said arm, and vertically spaced parallel plates between which said ball bearing is disposed and which the bearing engages whereby the platform is freely moveable in its plane while being held against rotation when said tube rotates.

15. In a device for detecting and indicating the position of trailer axles with respect to the true aligned position thereof; a pair of spaced carriages, parallel rails supporting said carriages for movement thereof longitudinally of a trailer having its wheels on said carriages, each carriage having a V block on which the trailer wheels rest and pivoted to the respective carriage on a vertical axis, a rigid member extending between said carriages and pivoted thereto on said axes, said member being freely slidable on each carriage in the direction of the length of said member, a centering element axially movable on each end of said member, means connecting said centering elements for equal and opposite movements of said member for engagement of the trailer wheels by said centering elements to locate said members axially with respect to said wheels, a projector carried by said member midway between said centering elements operable to project a beam of light forwardly beneath said trailer, a screen spaced from said device on which the light beam from the projector falls, and means for checking the accuracy and adjustment of said device comprising, a first pair of gauge bars equal length interconnected at one end and having their other ends adapted for connection with said V blocks on the axes of rotation thereof, a second pair of gauge bars also of equal length but different in length from said first gauge bars and also interconnected at their one end and having their other ends adapted for connection with said V blocks on the axes of rotation thereof, and sighting pins projecting into the beam from the projector from the said one ends of said gauge bars, whereby adjustment of the projector to bring the shadows of the sighting pins into alignment on the screen will bring said projector into a properly adjusted position.

16. The method of detecting and indicating the condition of alignment of the axle of a trailer which comprises; positioning the trailer wheels on carriages that are freely movable longitudinally of the trailer, locating the wheels on the carriages longitudinally so the position of each carriage corresponds to the position of the pertaining wheel, pivotally connecting a rigid member to corresponding points of said carriages and freely slidable laterally of the carriages at said points, mounting a projector on said member arranged to project a beam of light with a vertical reference line therein forwardly beneath the trailer in a direction perpendicular to a line joining the said points of the platform, adjusting said member laterally of the carriage to position said projector exactly midway between said wheels, placing a line on the axis of the kingpin of the trailer, and observing any condition of misalignment of the trailer axle by the lateral displacement of the reference line in said beam from the line on the axis of the kingpin.

17. The method of detecting and indicating the condition of alignment of the axle of a trailer which comprises; positioning the trailer wheels on carriages that are freely movable longitudinally of the trailer, locating the wheels on the carriages longitudinally so the position of each carriage corresponds to the position of the pertaining wheel, pivotally connecting a rigid member to corresponding points of said carriages and freely slidable laterally of the carriages at said points, mounting a projector on said member arranged to project a beam of light with a vertical reference line therein forwardly beneath the trailer in a direction perpendicular to a line joining the said points of the carriages, adjusting said member laterally of the carriages to position said projector exactly midway between said wheels, placing a line on the axis of the kingpin of the trailer, placing a screen in front of the trailer so the said beam will fall thereon and so the line on the axis of the kingpin will throw a shadow on the screen, and observing the amount and direction of any misalignment of the trailer axle by the lateral displacement on the screen of said reference line from said shadow.

18. The method according to claim 17 which includes the step of aligning a misaligned trailer axle by adjusting the axle until the said shadow coincides with the image of the said reference line on the screen.

19. The method according to claim 17 which includes the step of aligning a misaligned trailer axle by adjusting the axle in a horizontal plane until the said shadow coincides with the image of the said reference line on the screen.

20. The method according to claim 17 which includes the step of aligning a misaligned trailer axle by adjusting at least one end of the axle relative to the trailer in the longitudinal direction of the trailer until the said shadow coincides with the image of the said reference line on the screen.

References Cited

UNITED STATES PATENTS

| | | | |
|---|---|---|---|
| 2,275,137 | 3/1942 | Friestedt | 33—203.12 |
| 2,301,154 | 11/1942 | Tilton | 33—46.2 |
| 2,479,723 | 8/1949 | Brown | 33—193 |
| 2,590,722 | 3/1952 | Otis | 33—193 X |
| 2,632,256 | 3/1953 | Will | 33—193 |
| 2,845,718 | 8/1958 | Keymer | 33—193 |
| 2,972,189 | 2/1961 | Holub | 33—46.2 |
| 2,979,822 | 4/1961 | Wilkerson | 33—46.2 |

WILLIAM D. MARTIN, Jr., *Primary Examiner.*